United States Patent [19]

Lavin

[11] Patent Number: 4,921,641
[45] Date of Patent: May 1, 1990

[54] LIQUID-VAPOR CONTACT COLUMNS

[75] Inventor: John T. Lavin, Guildford, United Kingdom

[73] Assignee: The BOC Group, Inc., New Providence, N.J.

[21] Appl. No.: 306,958

[22] Filed: Feb. 6, 1989

[30] Foreign Application Priority Data

Feb. 5, 1988 [GB] United Kingdom ............... 8802627

[51] Int. Cl.$^5$ .................................................. B01F 3/04
[52] U.S. Cl. .......................... 261/112.2; 261/DIG. 72
[58] Field of Search ................. 261/112.2, DIG. 72; 428/550, 553, 554, 555, 566, 596, 603, 604, 937

[56] References Cited

U.S. PATENT DOCUMENTS

| | | | |
|---|---|---|---|
| 2,632,968 | 3/1953 | Ray | 428/937 |
| 3,150,940 | 9/1964 | Graves | 428/937 |
| 3,170,969 | 2/1965 | Lerner et al. | 261/DIG. 72 |
| 3,713,281 | 1/1973 | Asker et al. | 55/387 |
| 3,723,165 | 3/1973 | Longo et al. | 117/93.1 PF |
| 3,785,914 | 1/1974 | King | 261/DIG. 72 |
| 3,851,026 | 11/1974 | Heskett et al. | 261/DIG. 72 |
| 3,862,280 | 1/1975 | Polovina | 261/112.2 |
| 4,138,511 | 2/1978 | Rolles et al. | 427/201 |
| 4,157,929 | 6/1979 | Kubicek | 156/89 |
| 4,308,321 | 12/1981 | Hodes et al. | 428/676 |
| 4,324,749 | 4/1982 | Bronner | 261/DIG. 72 |
| 4,477,492 | 10/1984 | Bergna et al. | 427/215 |
| 4,597,916 | 6/1986 | Chen | 261/94 |
| 4,604,247 | 8/1986 | Chen et al. | 261/94 |
| 4,643,853 | 2/1987 | Braun | 261/112.2 |

FOREIGN PATENT DOCUMENTS

| | | |
|---|---|---|
| 0211443 | 2/1987 | European Pat. Off. . |
| 3625659 | 2/1988 | Fed. Rep. of Germany . |
| 2338065 | 8/1977 | France . |
| 2386008 | 10/1978 | France . |
| 59-222566 | 12/1984 | Japan . |
| 2152079 | 7/1985 | United Kingdom . |

*Primary Examiner*—John J. Zimmerman
*Attorney, Agent, or Firm*—Carol A. Nemetz; R. Hain Swope; Larry R. Cassett

[57] ABSTRACT

A packing for a liquid-vapor contact column is provided which comprises metallic sheets defining liquid-vapor passages and having at least one wettable surface comprised of a coating of porous metal. The sheets are perforated to permit vapor to pass between them. The porous metal coating is formed by spraying a particulate mixture of metal and a plastics material onto the sheet to form a coating of plastics particles embedded in metal and then heating to volatilize the plastic thereby forming porosity in the metal coating.

9 Claims, 3 Drawing Sheets x 500 x 5000

LIQUID-VAPOR CONTACT COLUMNS

This invention relates to liquid-vapor contact columns.

BACKGROUND OF THE INVENTION

In a liquid-vapor contact column, such as a distillation column, an ascending vapor is intimately contacted with a descending liquid. Members providing surfaces on which such contact can take place are disposed in the column. The members may comprise perforate, spaced, horizontal trays across which liquid flows and through which the ascending vapor passes, thus providing contact between them. Downcomers are used to conduct liquid from the exit end of one tray to the entrance end of the tray below.

An alternative method of contacting liquid and vapor is to use a packing in the columns. Column packings typically have a regular structure with defined flow channels. They have a large active mass exchange surface and give high separation performance with low pressure drop. The packing elements typically consist of thin corrugated sheets of material, such as gauze, stacked vertically to form open, intersecting channels at an angle to the column axis. As a result, the gas flowing through the packing is mixed in the direction of the parallel elements. By transposing successive elements, radial mixing is induced over the entire column cross-section.

Although structured column packings are widely used in distillation columns operating at above ambient temperature for fractionating liquid mixtures, they are not widely used commercially in separating gas mixtures, e.g. air, at cryogenic temperatures except on a small scale. In practice, there is a difficulty in limiting the height of the column when for example, air is being distilled. In accordance with this invention, there is provided a packing for a distillation or other liquid-vapor contact column which is able to ameliorate this difficulty.

SUMMARY OF THE INVENTION

According to the present invention there is provided a packing for a liquid-vapor contact column, comprising at least one array of liquid-vapor contact members of metallic sheet each of which defines liquid-vapor contact passages therethrough and has a wettable surface, each said wettable surface including a multiplicity of open pores, wherein said surface is formed by spraying a particulate mixture of metal and plastics material onto a surface of the metallic sheet to form a coating comprising particles of plastics embedded in metal and heating the thus-formed coating to volatize or otherwise remove the plastics material thereby forming pores in the coating.

The invention also provides a method of making a packing for a liquid-vapor contact column comprising, spraying a particulate mixture of metal and plastics material onto metallic sheets to form on each sheet a coating comprising particles of plastics embedded in metal, heating the coating to volatalize or otherwise remove the plastics material thereby forming pores in the coating, forming liquid vapor contact passages in the sheets, and forming the sheets into an array in the column.

BRIEF DESCRIPTION OF THE DRAWINGS

The method and apparatus according to the invention will now be described by way of example with reference to the accompanying drawings, in which.

DETAILED DESCRIPTION OF THE INVENTION

Figure 1:
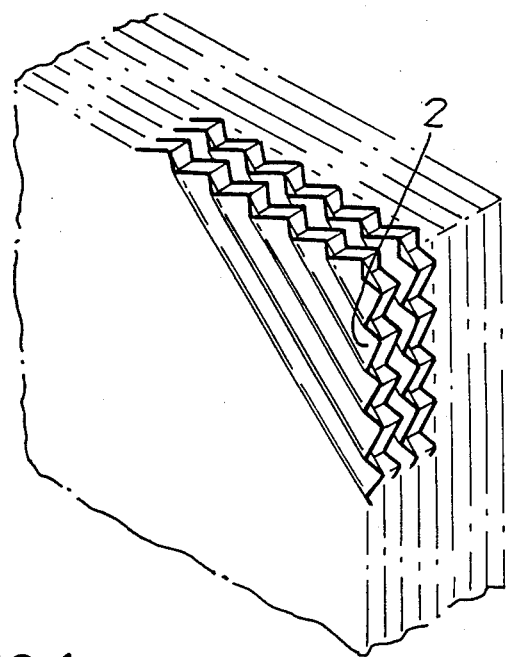
FIG. 1 is a schematic perspective view of a structured packing according to the invention.
Figure 2:
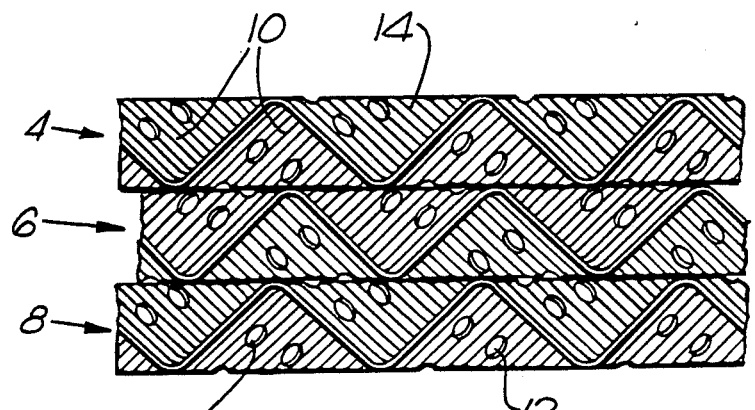
FIG. 2 is a schematic plan view of a fragment of the packing shown in FIG. 1.
Figure 3:
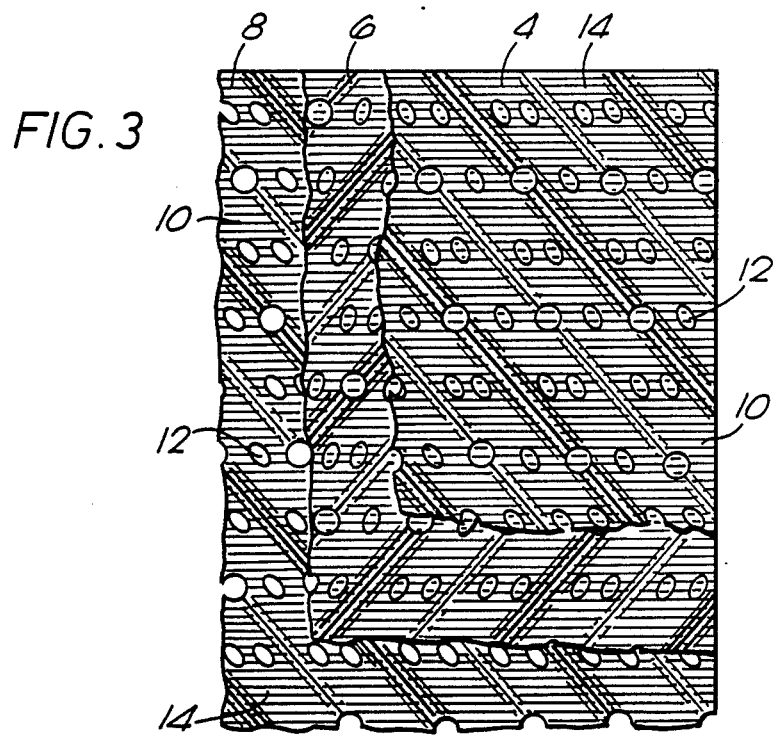
FIG. 3 is a schematic side view of a fragment of the packing shown in FIG. 1.

Referring to FIGS. 1 to 3 of the drawings, a structured packing comprises a multiplicity of vertical sheets 2 of heat conductive metal, usually aluminum or copper. In FIGS. 2 and 3, fragments of three adjacent sheets 4, 6 and 8 are shown. Viewed from one side, each sheet is provided with alternate peaks and troughs. The surfaces between neighboring peaks form liquid-vapor contact passages 10. Similarly, contact passages 10 are formed on the other side in a like manner. The passages 10 defined by one set of alternate sheets slope from left at the top to right at the bottom, and on the other set of the alternate sheets from right at the top to left at the bottom. The sheets are preferably all identical. The different directions of slope of the passages 10 are obtained by inverting alternate sheets. The sheets are each formed with perforations 12 which permit liquid and vapor to flow between the passages 10. Typically from 5 to 15% of the surface area of each sheet is occupied by the perforations 12. Each sheet may also be provided with a multiplicity of small parallel ridges 14 extending laterally across the sheet as shown in FIG. 3.

Figure 4:
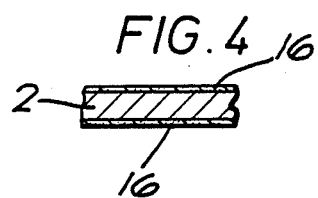
FIG. 4 is a schematic section of a fragment of a sheet forming part of the packing shown in FIGS. 1 to 3.

As shown in FIG. 4, each sheet has on both its sides a surface layer 16 of porous metal, which may be the same as or different from the sheet. Preferably, the porous metal has the same composition as the sheet and is aluminum, copper or an alloy based thereon, e.g. bronze. The plastics particles may be selected from a wide range of art-recognized polymeric materials. A preferred plastics material for forming the coatings is polyester. Utilizing polyester, a temperature of forms about 500° to 550° C. is preferably employed to effect volatilization thereof thereby forming the desired coating. Generally, the mixture comprises separate particles of plastics and metals, although if desired the mixture may comprise composite particles of plastics and metal.

Figure 5:
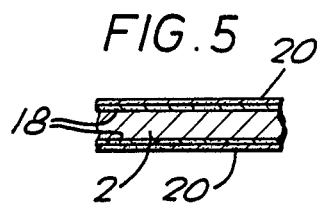
FIG. 5 is a schematic section of a fragment of an alternative sheet that can form part of the packing shown in FIGS. 1 to 3.

Each layer of the subject coatings preferably has a thickness in the range of 0.1 mm to 1.0 mm. In an alternative embodiment illustrated in FIG. 5, there are a plurality of layers of porous metal on each side of the sheet. Typically, the inner layers 18 have a smaller average pore size than the outer layers 20, although if desired, this difference in the average pore size may be reversed.

One example of the method according to the invention, a sheet such as shown in FIGS. 1 to 3 and preferably aluminum, is provided with a porous aluminum-silicon coating by the following procedure. The surface is first cleaned by shot-blasting. The surface is then plasma sprayed with a proprietary blend of silicon-aluminum alloy and polyester powder (Metco 601 NS). The plasma is formed by supplying to the spraying chamber argon at a pressure of 100 psig and hydrogen at a pressure of 50 psig. Flame spraying may also be utilized. The mixture of plastics powder and metal powder is sprayed onto the surface at 5 pounds to 7 pounds per hour to form continuous matrices of aluminum alloy with dispersed particles of polyester. The polyester is then driven off by heating in a vacuum for about two hours at a temperature on the order of 540° C. to form a network of open re-entrant pores having axes generally disposed at right-angles to the surface of the substrate although the spraying can be controlled to give the axes any any desired orientation. If desired, the passages 10 and perforations 12 may be formed after coating.

In general, the percentage porosity of the coating depends on the mass ratio of plastics powder to metal powder. The average size of the pores depends largely on the average size of the plastics particles. Accordingly, the invention enables the porosity to be varied independently of the average pore size and thus enables there to be prepared a surface specially tailored to the properties of a gas mixture being separated by distillation at cryogenic temperatures. The plastic and metal particles may each have a regular or irregular geometry but their flow properties must allow their use in a spray coating process.

Preferably, the plastics particles can have an average size in the range of about 15 to 150 microns. Typically, the mass ratio of metal particles to plastic particles in the mixture that is sprayed onto the substrate surface is from about 4:1 to 1:1 so that the coating has a porosity of from about 20% to 50% although, if desired, more porous coatings may be formed.

The average size of the metal particles is not critical to the invention and may be lower or higher than the average size of the plastics particles. Similarly, the thickness of the coating is not critical to the invention. In our experiments, we have prepared coatings comprising a single porous layer 5, 10 and 15 thousands of an inch in depth, and two-layer coatings wherein the layers have different average pore sizes. The distribution of pore sizes is preferably designed to give optimum liquid hold up and wetting and to result in a minimum HETP (height equivalent to theoretical plate).

Coated sheets for use in making a packing according to the invention typically have surfaces that comprise a network of open, re-entrant pores or cavities having an average size in the range 15 to 150 microns, preferably 15 to 50 microns. The nature of the coating is such that it provides the finished sheets with excellent wetting properties. Such properties are conducive to good liquid-vapor contact. Moreover, the wetting properties enable the packing to have a relatively low HETP and hence a relatively low pressure drop. Such characteristics are particularly beneficial when separating a mixture of cryogenic fluids of similar volatilities in particular air. Each sheet is preferably formed with alternate crests and troughs so as to define the liquid-vapor contact passages. In addition, the sheets are preferably perforate to enable vapor to pass from each passage to an adjacent one. The sheets are preferably arranged such that in alternate sheets the passages slope in different directions.

Figure 6:
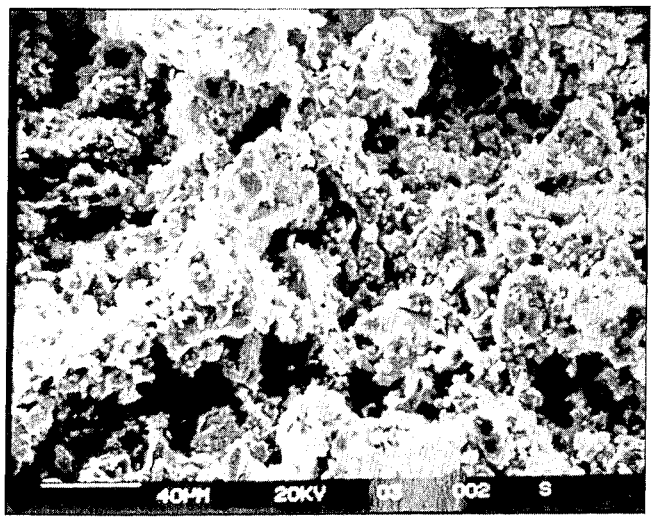
FIG. 6 is an electronmicrograph of the surface of a sheet forming part of a packing according to the invention showing the surface at a magnification of 500 times actual size.
Figure 7:
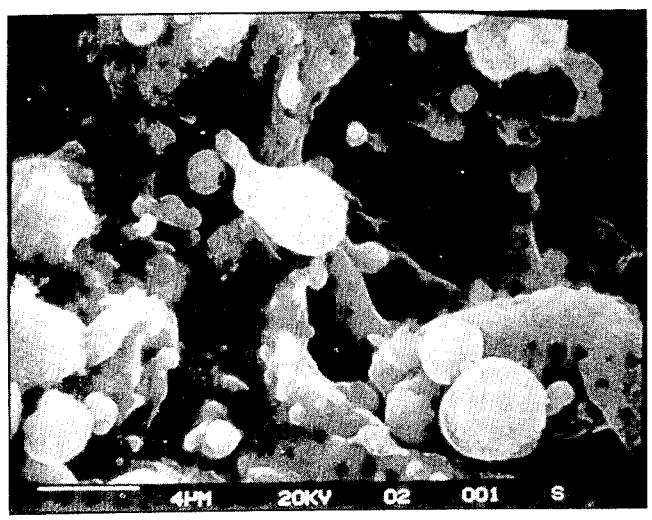
FIG. 7 is an electronmicrograph similar to FIG. 6 but at a magnification of 5000 times actual size.

FIGS. 6 and 7 are electromicrographs of a suitable surface formed by plasma spraying a mixture of 60% by weight of aluminum and 40% by weight of polyester onto an aluminum substrate and then baking the resulting coated substrate for two hours at 500° C. The coating had a thickness of 0.38 mm.

FIG. 6 shows the coated surface at a magnification of 500 times actual size, and FIG. 7 shows the surface at a magnification of 5000 times actual size.

I claim:

1. A packing for a liquid-vapor contact column, comprising at least one array of liquid-vapor contact members each defining liquid-vapor passages therethrough and having a wettable surface, wherein each member is comprised of a metallic sheet having at least one wettable surface including a multiplicity of open pores, wherein said surface is formed by spraying a particulate mixture of metal and a plastics material onto a surface of the metallic sheet to form a coating comprising particles of plastics embedded in metal, and heating the coating to volatilize or otherwise remove the plastics material, thereby forming the pores in the metal coating.

2. A packing in accordance with claim 1, wherein the coating has a porosity of from 20% to 50%.

3. A packing in accordance with claim 1, wherein the average size of the pores is from about 15 to 150 microns.

4. A packing in accordance with claim 3, wherein the average size of the pores is from about 15 to 50 microns.

5. A packing in accordance with claim 1, wherein each sheet is formed with alternate crests and troughs so as to define liquid-vapor contact passages.

6. A packing in accordance with claim 5, wherein the sheets are perforated to enable vapor to pass between them.

7. A packing in accordance with claim 5 wherein the passages slope on each sheet and the sheets are arranged such that, in alternate sheets, the passages slope in different directions.

8. A packing in accordance with claim 1, wherein the sheets are of aluminum or copper.

9. A packing in accordance with claim 8, wherein the metal coating is selected from the group consisting of aluminum, copper and alloys based thereon.

* * * * *